H. HARRIS.
HARNESS SNAP.
No. 46,468.  Patented Feb. 21, 1865.
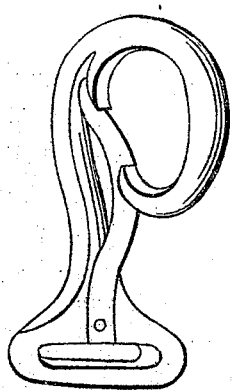
Witnesses:
O. B. Kinsey
John L. Kinsey
Inventor:
Horace Harris

UNITED STATES PATENT OFFICE.

HORACE HARRIS, OF NEWARK, NEW JERSEY.

IMPROVED HARNESS-SNAP.

Specification forming part of Letters Patent No. 46,468, dated February 21, 1865; antedated February 12, 1865.

*To all whom it may concern:*

Be it known that I, HORACE HARRIS, of the city of Newark, in the county of Essex and State of New Jersey, have invented an Improved Harness-Snap, to be called the "self-adjusting snap;" and I do hereby declare that the following is a full and exact description thereof, reference being had to the accompanying drawing, and to the letters marked thereon.

The nature of my invention consists in extending the spring A beyond the point of the hook B until it strikes the inside of the hook below the knob C.

The points gained are twofold: First, the snap becomes self-adjusting, being hooked or unhooked without the pressure of the thumb upon the spring in either case; secondly, the strain being upon the whole length of the spring, it is much less liable to break than when, as in the usual mode, the strain comes almost wholly upon a point near to where it is riveted to the hook.

The knob C is thrown up over the end of the spring to prevent the ring, when in use, wearing it. The end of the hook B is curled under to prevent the liability of the snap unhooking accidentally. For simplicity, convenience of use, and cheapness it becomes a valuable improvement upon any style in use.

What I claim as my invention, and desire to secure by Letters Patent, is—

The extension of the spring A, in combination with the knob C and the hook B, for the purposes herein set forth.

HORACE HARRIS.

Witnesses:
O. B. KINSEY,
JOHN L. KINSEY.